United States Patent [19]

Shell et al.

[11] 4,330,740
[45] May 18, 1982

[54] ENERGIZING CIRCUIT FOR PROVIDING LOW VOLTAGE STARTING FOR SUBMERSIBLE PUMP MOTOR

[75] Inventors: Lewis R. Shell, Tulsa; Joseph E. Vandevier, Broken Arrow, both of Okla.

[73] Assignee: Centrilift-Hughes, Inc., Claremore, Okla.

[21] Appl. No.: 79,852

[22] Filed: Sep. 28, 1979

[51] Int. Cl.³ .............................................. H02P 1/26
[52] U.S. Cl. ..................................... 318/780; 318/512
[58] Field of Search ............... 318/419, 780, 511, 512, 318/778; 310/68 D

[56] References Cited

U.S. PATENT DOCUMENTS

| | | | |
|---|---|---|---|
| 1,935,429 | 11/1933 | Barton | 318/780 |
| 2,542,296 | 2/1951 | Storsand | 318/419 |
| 2,629,076 | 2/1953 | Lloyd et al. | 310/68 D |
| 2,648,808 | 8/1953 | Tiede | |
| 3,675,057 | 7/1972 | Pleuger | 310/68 D |
| 3,885,175 | 5/1975 | Palloch | 310/68 D |

*Primary Examiner*—David Smith, Jr.
*Attorney, Agent, or Firm*—Robert A. Felsman

[57] ABSTRACT

Low voltage starting of a three-phase submersible pump motor in a shallow well is achieved by employing a high-impedance transformer for supplying the three-phase power to the motor. Upon starting, the normally heavy current drawn by the motor results in a voltage drop through the high-impedance transformer sufficient to substantially lower the voltage across the motor and hence the starting current. In the absence of limiting the starting current, abnormally high starting torques will be produced on the motor shaft resulting in mechanical fatigue and eventually shaft breakage.

3 Claims, 1 Drawing Figure

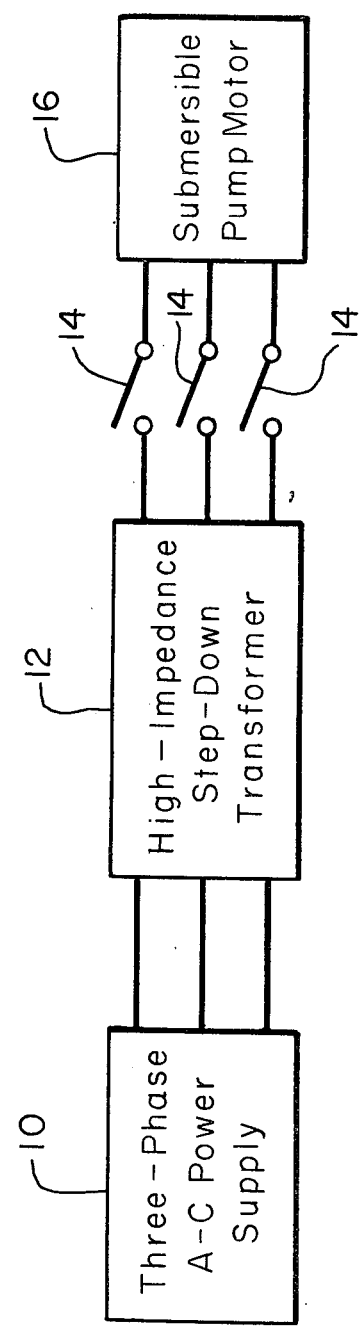

4,330,740

ENERGIZING CIRCUIT FOR PROVIDING LOW VOLTAGE STARTING FOR SUBMERSIBLE PUMP MOTOR

BACKGROUND OF THE INVENTION

This invention relates to an energization circuit, for a three-phase submersible pump motor, which reduces the motor voltage during the starting cycle.

Reduced voltage starting of three-phase submersible pump motors is especially desirable for shallow well installations (such as those wells less than 2,000 feet deep) where the relatively short cables feeding the motors introduce negligible voltage drops or line losses. With substantially full voltage from the surface a-c power source available at the motor terminals at start-up, very high starting current (and consequently high starting torque) will result and this can cause motor shaft failure from mechanical fatigue. The high starting current occurs since the motor, upon starting, appears as a low impedance to the power system. In contrast, in normal applications (namely, deeper well installations), the cable supplying power to the submersible pump motor provides a large voltage drop (a high line loss) which in turn decreases the starting torque and therefore the torque stresses on the shaft. In effect, the long cable for a deep well installation causes a voltage sag during start-up.

Several low voltage starting arrangements for motors have been developed in the past. For example, autotransformers with tap changers have been used in motor energizing circuits to produce low voltage on starting, the tap being switched after the starting cycle is completed. In other cases, inductors have been switched in series with the motor at start-up to introduce a voltage drop. Other examples of prior low voltage starters involve resistors and capacitors that are inserted into the energizing circuit.

The present invention provides a unique low voltage starting arrangement and constitutes a significant improvement over those previously developed. Moreover, the present scheme is more efficient and cost effective than the prior approaches. Furthermore, no circuit components need be switched in and out of the motor energizing circuit (namely, no moving parts) in switching between starting and running conditions.

SUMMARY OF THE INVENTION

The energizing circuit of the invention provides low voltage starting for a three-phase submersible pump motor located downhole in a relatively shallow well. The circuit comprises a three-phase a-c power supply for providing three-phase a-c voltage of relatively high magnitude. A three-phase step-down transformer, having its primary windings coupled to the a-c power supply and its secondary windings coupled to the three-phase submersible pump motor, develops a reduced magnitude three-phase a-c voltage for application to the pump motor to effect rotation thereof. The transformer has a relatively high impedance so that during start-up of the pump motor the initially high starting current produces a substantial voltage drop through the high impedance of the transformer, thereby immediately lowering the starting voltage across, and the starting current through, the pump motor.

DESCRIPTION OF THE DRAWING

The features of the invention which are believed to be novel are set forth with particularity in the appended claim. The invention, together with further advantages and features thereof, may best be understood, however, by reference to the following description in conjunction with the accompanying drawing which schematically illustrates, in block diagram form, an energizing circuit, for a three-phase submersible pump motor which may be located downhole in a relatively shallow well, constructed in accordance with the invention.

DESCRIPTION OF THE ILLUSTRATED EMBODIMENT

Block 10 represents the three-phase a-c power source which the power company or utility provides at, or in close proximity to, the surface of a shallow well installation. In a typical installation, the three-phase voltage distributed to the well site by the power company may, for example, be 7,200 volts. That high magnitude voltage would be stepped down by a transformer above the surface to, for example, 2,200 volts for delivery downhole to a submersible pump motor (of at least 225 horsepower) to effect rotation thereof. This is also true in the illustrated embodiment where three-phase step-down transformer 12, located above the surface of the well, has its primary windings coupled to a-c power supply 10 and its secondary windings coupled, through switches 14 and a submersible cable, to three-phase submersible pump motor 16. However, unlike the prior energizing circuits for submersible pump motors, transformer 12 is purposely constructed to have a relatively high impedance. This may be done, for example, by spacing the primary and secondary windings farther away from the iron core, thereby increasing the inductance reactance. Ordinarily, a transformer is made with the windings as close as possible to the core to minimize the impedance.

During normal operation when switches 14 are closed and motor 16 is running at normal speed, the high impedance introduced by transformer 12 in series between power source 10 and the load 16 will have relatively little effect. During that time motor 16 presents a substantial impedance which limits the current in transformer 12, thereby limiting the voltage drop through the transformer. Such a voltage drop will be no greater than the voltage drop (or line loss) in the long cable feeding a deep well pump motor when that motor is rotating at normal speed.

At start-up, on the other hand, the high impedance in transformer 12 effectively simulates the long cable impedance and causes a significant voltage sag, sufficient to reduce the starting torque to a level which eliminates shaft failure. To explain, at start-up the motor presents a low impedance and accordingly high starting current will initially flow through the motor. This motor inrush current, in flowing through the high impedance of the transformer, produces a sizeable voltage drop, thereby immediately lowering the starting voltage across, and the starting current through, the pump motor. In a submersible pump motor the starting torque is a function of the motor voltage to the 3.5 power. Hence, a small reduction in voltage produces a significant decrease in the starting torque of the motor. The result of high impedance transformer 12 is that reduced torque is produced by the motor on starting. As a consequence, the drive system of the pump is subject to much less mechanical stress, thereby preventing shaft failure.

While a particular embodiment of the invention has been shown and described, modifications may be made, and it is intended in the appended claim to cover all such modifications as may fall within the true spirit and scope of the invention.

We claim:

1. An energizing circuit for providing low voltage starting for a three-phase submersible pump motor located downhole in a relatively shallow well, comprising:
   a three-phase a-c power supply for providing three-phase a-c voltage of relatively high magnitude;
   and a three-phase step-down transformer, having its primary windings coupled to said a-c power supply and its secondary windings coupled to the three-phase submersible pump motor, for developing a reduced magnitude three-phase a-c voltage for application to the pump motor to effect rotation thereof,
   said transformer having a relatively high impedance so that during start-up of the pump motor the initially high starting current produces a substantial voltage drop through the high impedance of the transformer, thereby immediately lowering the starting voltage across, and the starting current through, the pump motor.

2. An energizing circuit for providing low voltage starting for a three-phase submersible pump motor located downhole in a relatively shallow well, comprising:
   a three-phase a-c power supply for providing three-phase a-c voltage of relatively high magnitude;
   and a three-phase step-down transformer, having its primary windings coupled to said a-c power supply and its secondary windings coupled to the three-phase submersible pump motor, for developing a reduced magnitude three-phase a-c voltage for application to the pump motor to effect rotation thereof,
   said transformer having a relatively high impedance that is constant during starting and operation of the motor so that during start-up of the pump motor the initially high starting current produces a substantial voltage drop through the high impedance of the transformer, thereby immediately lowering the starting voltage across, and the starting current through, the pump motor.

3. An energizing circuit for providing low voltage starting for a three-phase submersible pump motor located downhole in a relatively shallow well, comprising:
   a three-phase a-c power supply for providing in combination three-phase a-c voltage of relatively high magnitude, the pump motor being at least 225 horsepower;
   and a three-phase step-down transformer, having its primary windings coupled to said a-c power supply and its secondary windings coupled through power cable of less than 2,000 feet in length to the three-phase submersible pump motor, for developing a reduced magnitude three-phase a-c voltage for application to the pump motor to effect rotation thereof,
   said transformer having a relatively high impedance that remains constant during starting and operation of the motor so that during start-up of the pump motor the initially high starting current produces a substantial voltage drop through the high impedance of the transformer, thereby immediately lowering the starting voltage across, and the starting current through, the pump motor.

* * * * *

UNITED STATES PATENT AND TRADEMARK OFFICE
CERTIFICATE OF CORRECTION

PATENT NO. : 4,330,740

DATED : May 18, 1982

INVENTOR(S) : Lewis R. Shell and Joseph E. Vandevier

It is certified that error appears in the above-identified patent and that said Letters Patent is hereby corrected as shown below:

Column 3, Claims 1 and 2 should be deleted.
Column 4, Claim 3, line 14, "located downhole in a relatively shallow well" should be deleted.
Claim 3 should be renumbered "Claim 1".
Column 4, line 15, "comprising" should read --consisting of--.

Signed and Sealed this

Sixteenth Day of November 1982

[SEAL]

Attest:

GERALD J MOSSINGHOFF

Attesting Officer     Commissioner of Patents and Trademarks